Dec. 17, 1963 R. E. CREATH ETAL 3,114,561
COMPOSITE SEAL WITH RESILIENT EXPANSION MEMBER
Filed Oct. 13, 1959 2 Sheets-Sheet 1

INVENTORS
ROY E. CREATH,
ARTHUR K. COOK
BY
Thomas P. Mahoney
ATTORNEY

Dec. 17, 1963  R. E. CREATH ETAL  3,114,561
COMPOSITE SEAL WITH RESILIENT EXPANSION MEMBER
Filed Oct. 13, 1959  2 Sheets-Sheet 2
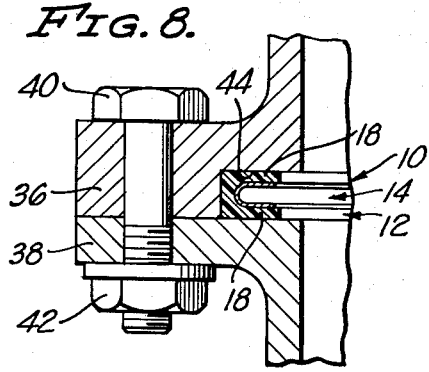
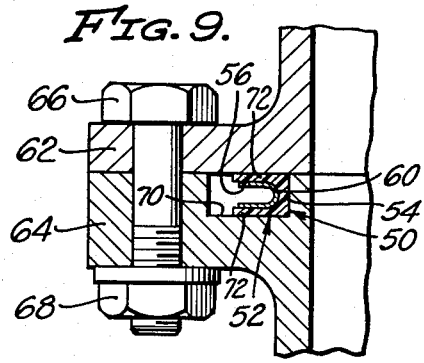
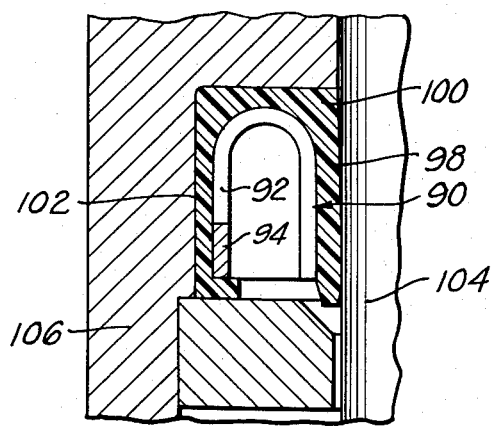
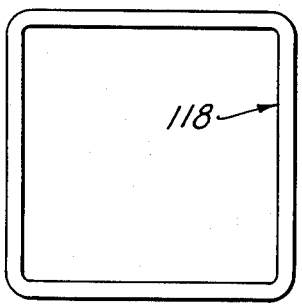
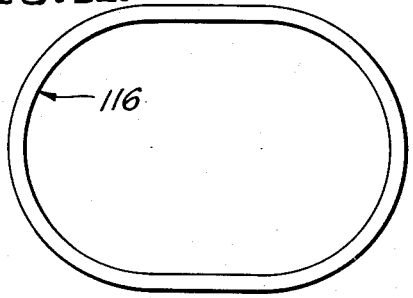
INVENTORS
ROY E. CREATH,
ARTHUR K. COOK
BY
Thomas P. Mahoney
ATTORNEY

United States Patent Office 3,114,561
Patented Dec. 17, 1963

3,114,561
COMPOSITE SEAL WITH RESILIENT
EXPANSION MEMBER
Roy E. Creath, Encino, and Arthur K. Cook, Sherman
Oaks, Calif.; said Cook assignor to said Creath
Filed Oct. 13, 1959, Ser. No. 846,144
2 Claims. (Cl. 277—152)

This invention relates to a fluid seal and, more particularly, to a fluid seal adapted to be utilized in environments where conventional seals fabricated from neoprene and natural or synthetic rubbers cannot ordinarily be utilized with success.

At the present time, many pipe lines are carrying highly volatile fuels, acids, alkalis and the like, and other highly corrosive or deteriorating fluids. In sealing the joints between the sections of pipe constituting the pipe lines, conventional fluid seals have been found to be impractical due to the fact that many of the fluids flowing through the pipe lines immediately attack seals molded from conventional resilient materials such as neoprene and the various natural and synthetic rubbers.

Therefore, the use of a material which is more resistant to deterioration when exposed to highly volatile and corrosive fluids in the seal body has been indicated and it has been discovered that a desirable inert material for use in sealing pipe line joints is a synthetic plastic sold under the trademark "Teflon" and described chemically as a tetrafluoroethylene polymer. Unfortunately, "Teflon" is not resilient and is not readily extrudable and seal bodies fabricated therefrom must be machined into the desired shape.

In order to overcome the inherent lack of resilience in the "Teflon" seal body, prior art devices have utilized such conventional expedients as Belleville washers and the like. Of course, the utilization of such Belleville washers is limited to use in conjunction with small size seal bodies because it is not practical to fabricate large Belleville washers. Furthermore, Belleville washers and conventional spring expansion members customarily utilized in conjunction with "Teflon" seal bodies are usually limited to circular forms and thus it is impossible to utilize them in sealing irregularly shaped openings and the like.

While the seal of the invention is described hereinbelow as utilizing "Teflon" in the seal body, it is conceivable and intended that materials other than "Teflon" be utilized in conjunction with the expansion member constituting a part of the seal and it is not desired that the scope of the invention be limited to the incorporation of a particular material in the seal body. For instance, it is conceivable that other inert materials such as "Kel-F," which is a polymer of trifluorochloroethylene, be utilized. In addition, metals such as various light-gauge stainless steels may be utilized in the seal body.

It is, therefore, an object of the invention to provide a seal body interposable between surfaces to be sealed which includes a recess therein and has an expansion member associated therewith constituted by a unitary resilient element or strip incorporating a plurality of expansion openings therein adapted to facilitate the deformation of the strip into conformity with the configuration of the seal body in which it is incorporated.

Further, the seal of the invention is characterized by the fabrication of the seal body from an inert material which may or may not have the resilient characteristics normally necessary to bias the sealing portions of the seal body into contiguity to adjacent surfaces to be sealed. The seal is further characterized by the incorporation in a recess in said seal body of a resilient expansion member which may be formed from such material as stainless spring steel which can be readily deformed into a configuration conforming to that of the seal body because of the incorporation therein of expansion openings which permit the expansion member to be bent into the configuration of the seal body.

As an example, a typical expansion member may be fabricated in any desired length from a ribbon of stainless steel which is subjected to a single punching operation to form a plurality of expansion openings down its center. The punched strip is then fed between forming rolls to shape the expansion member into a channel shape configuration which may be generally U-shaped or V-shaped. The formed expansion member can then be cut to a length equal to the length of the recess in the seal body with which it is to be associated and, if the seal is not a linear but is a closed seal configuration, such as a circle or rectangle, the ends of the expansion element may be secured to each other by spot welding or the like and the expansion element fitted into the recess in the seal body.

Because of the provision of the expansion openings therein, it is possible to readily deform the expansion member and to accommodate it to seal bodies of circular, generally rectangular, elliptical, ovoid and many other shapes as long as a radius of predetermined curvature can be permitted to the expansion member at the corners of the configuration into which it is being formed.

Thus, an expansion member of any length can be provided for use in conjunction with a seal body of any length and it is possible to fabricate linear seals for use as gaskets or the like which will incorporate expansion members for use in conjunction with seal bodies having recesses therein for the reception of said expansion members of relatively unlimited sizes and shapes.

Another object of our invention is the provision of a composite fluid seal which is adapted for use in both dynamic and static applications and which is characterized by the fact that it may be modified by changes in the design of the expansion member to provide a seal which can exert a different sealing force on one side of the seal body than the other side thereof.

Other objects and advantages of the invention will be apparent from the following specification and the accompanying drawing, which is for the purpose of illustration only and in which:

FIG. 8 is an enlarged, fragmentary, sectional view showing a typical application of the seal of the invention;

FIG. 9 is another view showing the application of the seal of the invention;

FIG. 10 is an enlarged, fragmentary, sectional view showing a dynamic application of an alternative embodiment of the seal of the invention;

FIG. 11 is a plan view showing a seal of the invention constructed in substantially ellipsoidal configuration;

FIG. 12 is a plan view showing a seal of the invention constructed in substantially square form.

Figure 1:
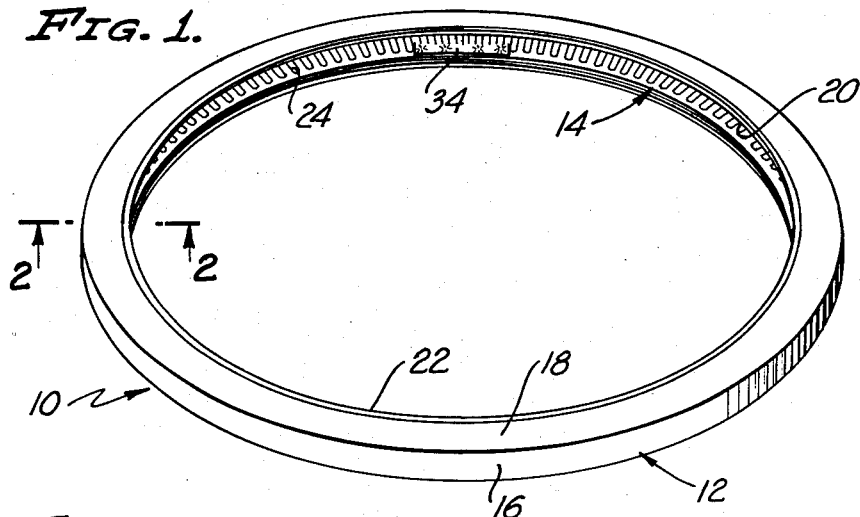
FIG. 1 is a perspective view showing a typical seal constructed in accordance with the teachings of the invention.
Figure 2:
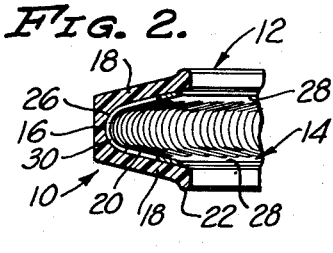
FIG. 2 is a transverse sectional view taken on the broken line 2—2 of FIG. 1.

Referring to the drawings and, particularly to FIGS. 1–2 thereof, we show a seal 10 of circular configuration which includes a body 12 formed from "Teflon" or the like and an expansion member 14 formed from spring-type stainless steel. As previously indicated, "Teflon" is a fundamentally non-resilient material and the body 12 is fabricated by machining it from a tubing of appropriate diameter.

The body 12 includes an end wall 16 and outwardly splayed side walls 18 which define a substantially U-shaped groove or recess 20 in which the expansion member 14 is located. As previously indicated, the body 12 can be fabricated from any desirable type of inert material, that is, inert to the action of the fuels or other fluids to which the body is exposed.

Since such inert materials are frequently characterized by an inherent lack of the resilience necessary to maintain a sealing engagement with the adjacent surfaces to be sealed, the expansion member 14 is provided. Incidentally, at their inner circumferences the side walls 18 of the body 12 incorporate outwardly directed intergral beads 22 which serve as points of contact for the side walls on adjacent surfaces in static applications of the seal 10.

The expansion member 14 utilized in the seal 10 is of substantially U-shaped configuration and is fabricated from an elongated strip of spring-type stainless steel which has a plurality of slots 24 formed therein which constitute expansion openings and which define a continuous series of ribs 26 which have their outer extremities terminating in continuous edges 28 provided on the expansion member 14. The bights 30 of the ribs 26 are arcuate and conform substantially to the configuration of the inner surface of the end wall 16 while the legs of the ribs 26 are splayed outwardly to urge them and the associated continuous edges 28 of the expansion member 14 into engagement with the inner surfaces of the side walls 18 of the body 12.

Figure 3:
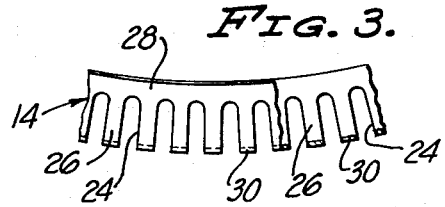
FIG. 3 is an enlarged, fragmentary, partly sectional view of a typical expansion member utilized in the seal of the invention.

Therefore, the substantially non-resilient side walls 18 of the body 12 are biased, in a manner to be described in greater detail below, into engagement with juxtaposed surfaces to be sealed by the expansion action of the expansion member 14. The slots 24 constituting the expansion openings permit the deformation of the expansion member 14 into any desired configuration, such as the circular configuration of the expansion member shown in FIGS. 1–3 of the drawings, and when the expansion member 14 has been so formed the juxtaposed extremities thereof are joined together by a pair of gusset plates 34 spot welded or otherwises secured to the adjacent edges 28 of said expansion member. After having been formed into the aforesaid circular configuration, the expansion member 14 is fitted into the groove or recess 20 in the body 12 and the seal 10 constituted by the body 12 and the expansion member 14 is ready to be applied in the particular location in which it is to be utilized.

The use of a seal 10 is graphically illustrated in FIG. 8 of the drawings wherein there is shown a pair of abutting pipe flanges 36 and 38 maintained in operative relationship with each other by means of a bolt 40 and associated nut 42. The pipe flange 36 incorporates an annular groove 44 which is adapted to receive the circular body 12. The side walls 18 of the body 12 are engaged, respectively, against the adjacent area of the pipe flange 38 and the annular groove 44 and are maintained in sealing relationship with said areas by the expansive effect of the expansion member 14. Thus, egress of fluid through the joint between the abutting surfaces of the pipe flanges 36 and 38 is prevented.

Illustrated in FIG. 9 of the drawings is a seal construction 50 manufactured in accordance with the teachings of the invention wherein the body 52 of the seal 50 has its end wall 54 constituting its inner circumference and wherein the annular groove 56 opens outwardly to receive an expansion member 60. The expansion member 60 is deformed in such a manner that the slots 24 constituting the expansion openings are actually reduced in width because the strip constituting the expansion member 60 is bent in a direction opposite that shown in FIG. 3 of the drawings.

In any event, the seal construction 50 is utilized in conjunction with a pair of pipe flanges 62 and 64 maintained in operative relationship with each other by a bolt 66 and co-operating screw 68. An annular groove 70 is formed in the flange 64 for the reception of the seal construction 50 and the opposite side walls 72 of the body 52 are biased into engagement with the adjacent surfaces of the groove 70 and the pipe flange 62.

Figure 4:
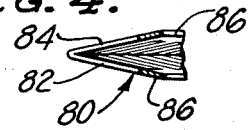
FIG. 4 is a fragmentary, partly sectional view of an alternative configuration of an expansion member adapted to be incorporated in the seal of the invention.

In applications where a seal body of relatively small cross section is utilized, it might be desirable to provide an expansion member 80 of V-shaped cross section, FIG. 4, which, as in the case of the expansion member 14, includes a plurality of expansion slots or openings 82 which facilitate the deformation of the expansion member 80 and which define ribs 84 having opposite edges 86 of said expansion member formed integrally therewith. The expansion member 80 is preferably installed in a recess or groove in a seal body which conforms substantially to the V-shaped configuration of the expansion member 80 and the opposite edges 86 of the expansion member 80 are biased outwardly in the same manner as are the opposite edges 28 of the expansion member 14.

Figure 5:
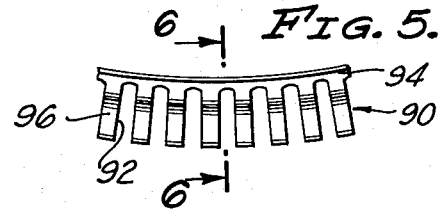
FIG. 5 is an enlarged, fragmentary, sectional view of another form of an expansion member adapted to be utilized in the seal of the invention.
Figure 6:
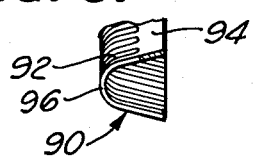
FIG. 6 is a transverse sectional view taken on the broken line 6—6 of FIG. 5.

In certain applications it is desirable to impart to the adjacent side wall of an associated seal body an expansive force which differs from the expansive force exerted upon the opposite side wall by the associated expansion member. To accomplish this desired end, we provide an expansion member 90, as best shown in FIGS. 5 and 6 of the drawings, said expansion member being of substantially U-shaped cross section and incorporating a plurality of slots 92 which extend from one continuous edge 94 of the expansion member 90 to the opposite edge thereof so that the ribs 96 defined by the slots 92 are free from operative connection to each other at one edge of the expansion member.

Therefore, the individual ends of the ribs 96, when engaged upon the internal surface of an adjacent side wall 98 of a seal body 100, as best shown in FIG. 10 of the drawings, serve to impose an expansive force upon the associated side wall 98 greater than the force imposed upon the opposite side wall 102 of the body 100 by the continuous edge 94 juxtaposed to the side wall 102. In the installation shown in FIG. 10 of the drawings the side wall 98 is adapted to be urged by the individual ribs 96 against the perimeter of a cylindrical body 104, engagement of said side wall 98 with said body 104 being accomplished by sliding movement of an encompassing coupling member 106 with respect to the body 104.

Figure 7:
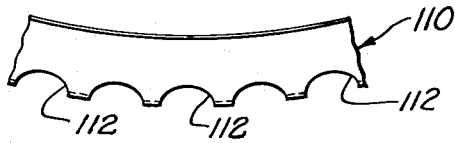
FIG. 7 is an enlarged, fragmentary, partly sectional view of another configuration of an expansion member adapted to be utilized in conjunction with an associated seal body to constitute a seal of the invention.

Of course, it is not intended that the teachings of the invention be restricted to any particular configuration of expansion openings and the expansion member 110 illustrated in FIG. 7 of the drawings includes expansion openings constituted by substantially circular apertures 112 which permit deformation of the expansion member 110. Of course, the greater the depth of the expansion openings provided in a particular expansion member, the greater the extent to which deformation of the expansion member to conform to predetermined configurations of associated seal bodies may be accomplished. Illustrative of the widespread application of the teachings of the invention is the substantially elliptical seal 116 shown in FIG. 11 of the drawings. Of course, expansion members similar to the expansion member 14 can be readily deformed into elliptical configurations similar to the configuration of the seal 116. In addition, it is possible to form square seals such as the seal 118 shown in FIG. 12, so long as the radius imparted to the expansion member is sufficiently great to permit the gradual bending of the expansion member at the corners of the seal 118.

Another aspect greatly increasing the utility of applicants' invention is the fact that seals of relatively unlimited length can be provided by utilizing an elongated expansion member in conjunction with a correspondingly elongated linear seal body.

By the utilization of the teachings of the invention it is possible to provide seal constructions adapted for use in conjunction with various types of highly volatile and deteriorative fluids which are also capable of being manufactured in a wide variety of size and shape requirements. In addition, the seal construction adapts itself particularly to the use of those chemically inert materials such as "Teflon," which are characterized by the lack of inherent resilience customarily entailed in seal applications.

We claim:

1. In a fluid seal, the combination of: a sealing body having an end wall and opposed side walls defining a recess therebetween, said side walls each having a continuous external bead adjacent the free edge thereof; and a stiffening member of substantially U-shaped cross section disposed in said body, said stiffening member including opposite edges underlying the aforesaid side walls of said body and adapted to maintain said side walls in spaced relationship with each other, said stiffening member incorporating a plurality of transverse openings therein extending across said member adapted to facilitate the deformation of said stiffening member into a configuration corresponding to that of said body, said member having continuous edges defining the outer extremities of said openings.

2. In a seal, the combination of: a body incorporating end and side walls defining a groove in said body, said side walls each having a continuous external bead adjacent the free edge thereof; and a resilient stiffening member inserted in said groove and including continuous opposite edges juxtaposed to and located within the inner edges of said side walls, said edges of said stiffening member being maintained in spaced relationship with each other by a continuous series of spaced, transverse ribs formed integrally with said edges of said stiffening member.

References Cited in the file of this patent

UNITED STATES PATENTS

| | | |
|---|---|---|
| 1,969,008 | Hubbard | Aug. 7, 1934 |
| 2,512,883 | Warren | June 27, 1950 |
| 2,560,557 | Curtis | July 17, 1951 |
| 2,630,343 | Jones et al. | Mar. 3, 1953 |
| 2,701,155 | Estel | Feb. 1, 1955 |
| 2,898,167 | Tanner | Aug. 4, 1959 |

FOREIGN PATENTS

| | | |
|---|---|---|
| 589,768 | Great Britain | June 30, 1947 |
| 758,447 | Great Britain | Oct. 3, 1956 |
| 190,756 | Austria | July 25, 1957 |